May 26, 1970 A. FISCHER 3,514,555

PROGRAMMING DEVICE

Filed Aug. 29, 1968 2 Sheets-Sheet 1

Inventor:
Artur Fischer
BY Michael S. Striker

Inventor:
Arthur Fischer

United States Patent Office 3,514,555

Patented May 26, 1970

3,514,555

PROGRAMMING DEVICE

Artur Fischer, 133 Grunmettstetterstr., D-7241 Tumlingen, Germany

Filed Aug. 29, 1968, Ser. No. 756,102
Claims priority, application Germany, Sept. 7, 1967, 1,603,328
Int. Cl. H01h 3/58
U.S. Cl. 200—17 14 Claims

ABSTRACT OF THE DISCLOSURE

A programming device for programming the intermittent operation of an apparatus to be controlled includes a rotary disc rotatable about its axis. The circumferential edge face of the disc is provided with an undercut circumferential groove and carries at axially opposite sides of this groove two electrically conductive rings. A programming member in form of a segment of a circle and consisting of electrically non-conductive material is releasably anchorable in the groove and projects outwardly therefrom overlying both electrically conductive rings at that position at which it is anchored at a given time. Thus, when sliding contacts slide along the rings in response to rotation of the disc member they encounter the programming member and are temporarily deflected out of electrically conductive engagement with the rings while sliding over the programming member.

BACKGROUND OF THE INVENTION

The present invention relates to a programming device in general, and more particularly to a programming device for programming the intermittent operation of an apparatus to be controlled. Still more particularly the present invention relates to such a programming device which is especially suitable for use in toys and toy construction kits.

It is well known that mechanically and/or electrically operable toys, whether they be of the already assembled type or whether they be erectable from toy construction kits, are becoming ever more sophisticated and true-to-life in their operation. As a part of this trend it became necessary to provide means for programming a sequence of operations in certain toys, for instance to periodically make or break electrical contact in order to operate a blinker installation or the like. To accomplish this purpose it is known to provide programming rollers having a plurality of circumferentially distributed cam faces which, as the programming roller is rotated about its axis, engage and actuate respectively associated switches to thereby make or break electrical contacts. Such devices are by no means inoperable, but they do suffer from a variety of drawbacks. One of these is the fact that they must necessarily be relatively complicated in their construction and must accordingly be rather expensive to manufacture. Another disadvantage is that these devices—which are of course required to be relatively compact when they find use in toy constructions—do not impart to the child playing with such a toy any significant understanding of their operation. This is in part due to the fact that the necessary compactness of these devices makes it difficult for the child to discern the functional cooperation between any given cam face, the associated switches and the component or components of the toy which are controlled thereby, and in part because such programming devices are supplied as complete units and can be used only as complete units and only in the form in which they are supplied so that a child has no influence and control over the program established by these devices.

It is accordingly an object of the present invention to overcome the aforementioned disadvantages.

More particularly it is an object of the present invention to provide a programming device which is simple and relatively inexpensive in its manufacture, and which permits the child to determine for himself or herself the frequency and sequence of operations which is to be programmed rather than presenting the child with a predetermined non-variable program.

An additional object of the invention is to provide such a programming device which will aid the child in obtaining a clear understanding of how such a program is established and controlled by affording the child the possibility to establish and observe true-to-life programming.

Furthermore, the device according to the present invention is to be applicable for programming mechanical as well as electrically controlled operations.

Summary of the invention

In pursuance of the above objects and of others which will become apparent hereatter, one feature of my invention resides in the provision of a programming device for programming the intermittent operation of an apparatus to be controlled by cooperation with a sensing instrumentality of such apparatus. The programming device includes rotary means rotatable about an axis and having a circumferential edge face provided with an undercut circumferential groove. Programming means is provided which includes at least one programming member having a first portion received in the groove and a second portion which projects outwardly of the groove beyond the edge face. The programming member is positionable at a plurality of circumferentially spaced locations of the rotary means so that, when a sensing instrumentality of an apparatus to be controlled slides on the edge face in response to rotation of the rotary means, such sensing instrumentality will encounter and be influenced by the programming member with a periodicity determined by the rate of revolution of the rotary means about its axis.

Advantageously the rotary means, which will be configurated as a disc member, will be provided at opposite axial sides of the circumferential groove with two electrically conductive rings carried on the circumferential edge face and in electrically conductive contact with for instance a source of electrical energy. Of course, it is possible to reverse this and to have the electrically conductive rings be in contact with the source of electrical energy through sliding contacts, and to have the rings then in turn connected through suitable connecting means with the apparatus to be controlled.

In any case, the programming member will advantageously be configurated as a segment of the circle with the second portion thereof overlying both of the electrically conductive rings at the location which has been chosen for the programming member. Thus, when sliding contacts slide on these electrically conductive rings in response to rotation of the disc-shaped member, they will be deflected out of such electrically conductive contact by engagement with the programming member which consists of electrically non-conductive material. As they slide over this programming member they will remain out of electrically conductive contact with the rings for the time which it takes for them to traverse the programming member and to contact the rings again downstream thereof. If a single programming member is used, the period of time for which electrical contact is established between the rings and the sliding contacts, and the period of time for which this electrical contact is interrupted can be most simply selected and controlled at will by appropriate selection of the number of revolutions of the disc-shaped member. It is clear, of course, that additional ones of the programming members can be provided so that two or more such programming members can be positioned at circumferentially spaced locations of the circumferential edge face of the disc-shaped member, the positioning being determined by the periodicity which is desired for the program being established.

Evidently, however, the invention is clearly applicable even if no control of electrical energy is involved because instead of sliding contacts some other form of sensing means sliding along the circumferential edge face of the disc-shaped member can evidently also be influenced in desired manner by the single or plurality of programming members to thereby obtain a mechanical programming.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiments

Figure 1:
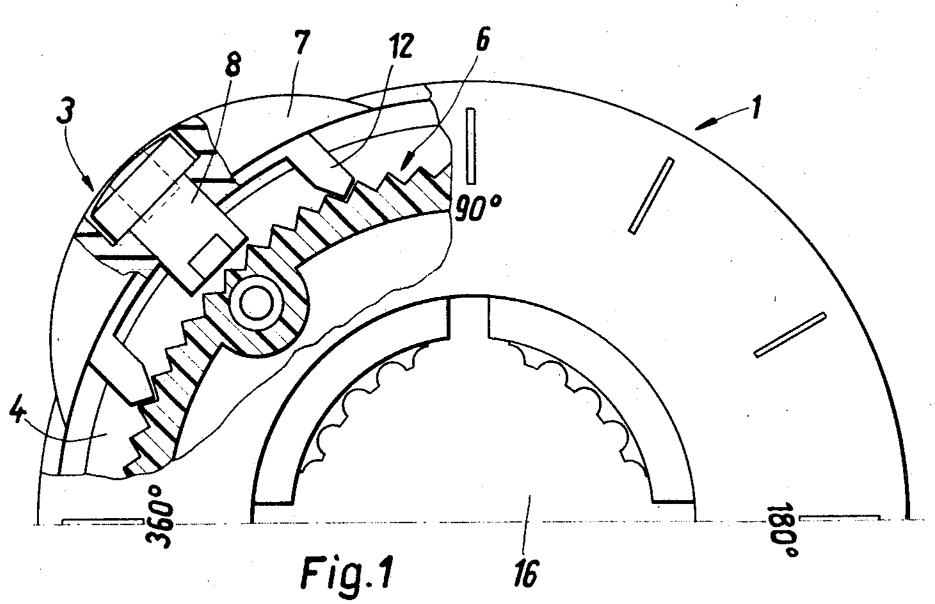
FIG. 1 is a fragmentary view in side elevation with parts broken away and other parts sectioned, of a programming device embodying the present invention.
Figure 2:
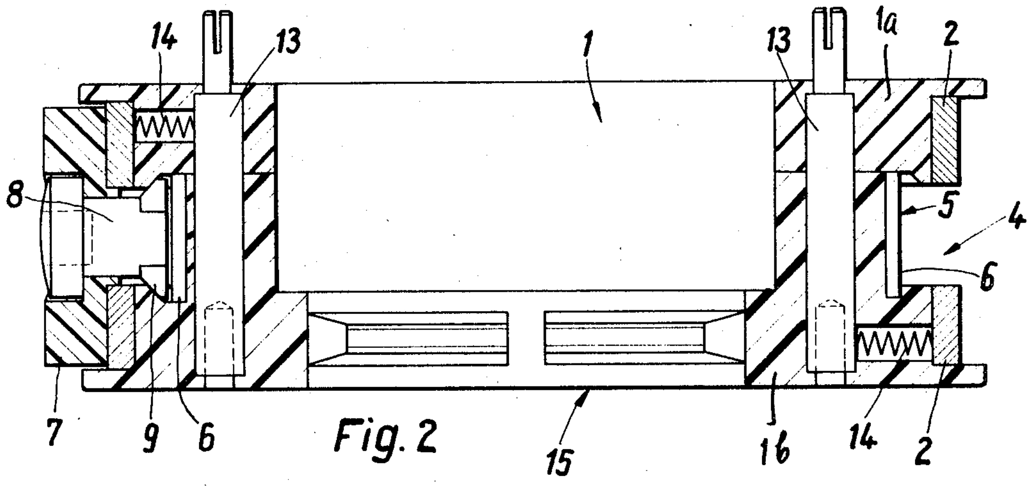
FIG. 2 is a transverse section through a programming device of the type illustrated in FIG. 1.
Figure 3:
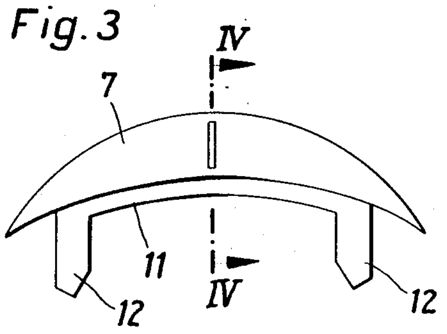
FIG. 3 is a perspective view of a programming member of the type used in FIGS. 1 and 2.
Figure 4:
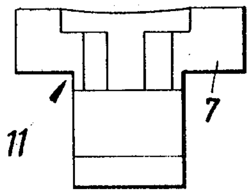
FIG. 4 is a section taken on the line IV—IV of FIG. 3.
Figure 5:
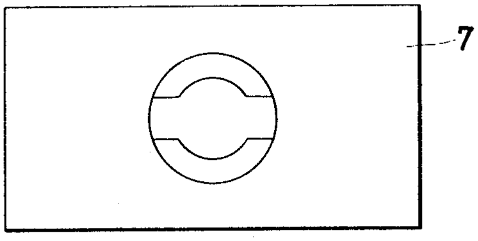
FIG. 5 is a top-plan view of the embodiment shown in FIG. 3.
Figure 6:
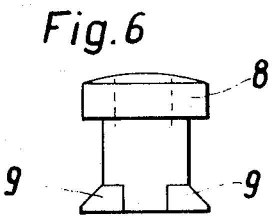
FIG. 6 is a perspective view of a component of the programming member shown in FIG. 3.
Figure 7:
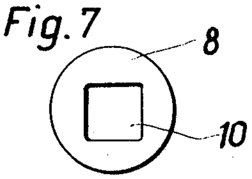
FIG. 7 is an end view of the component shown in FIG. 6.

As seen in FIGS. 1 and 2 the programming device according to the present invention consists primarily of three components, namely the disc-shaped member 1, the electrically conductive rings 2 which are provided on the circumferential edge face of the member 1, and the programming member 3.

The disc-shaped member 1 consists in the illustrated embodiment of two connected discs *1a* and *1b* (see FIG. 2) and has a circumferential edge face provided with an undercut groove 4. This groove 4, whose cross-sectional configuration is clearly visible in FIG. 2, extends circumferentially of the circumferential edge face of the member 1. Advantageously the member 1 will consist of synthetic plastic material.

Located on and carried by the circumferential edge face of the member 1 at opposite axial sides of the undercut groove 4 are respective electrically conductive rings 2 of suitable material. The bottom wall 5 of the undercut groove 4 is provided with circumferentially spaced projecting teeth 6 as shown in FIGS. 1 and 2.

Mounted in the member 1, which may be considered a hollow cylindrical member, are contact elements 13 which are electrically conductively connected with the respective rings 2 by biasing members 14 (see FIG. 2) located in suitable channels or the like and being, of course, also electrically conductive. The elements 14 are thus in conductive connection both with one of the rings 2 and with one of the elements 13.

An axial bore 16 is provided in the member 1 coaxially with the axis of rotation thereof, and a two-component hub is received in this bore 16 flush with the axial end face 15—in this embodiment—the hub being capable of clampingly engaging a shaft on which the element of the member 1 is to be mounted for rotation therewith. Such hubs are already known and need not be further described.

FIGS. 1–7 all illustrate in detail the construction of the programming member 3. It will be seen that it consists of a first portion 11 (see FIG. 3) which is located within the groove 4 and a second portion 7 which is located outside of the groove 4 and which overlies at the selected circumferential location both of the rings 2. In this embodiment the member 3 is configurated as a segment of the circle and its free outer face facing radially of the member 1 is so inclined at the opposite spaced ends of the portion 7 as to extend tangentially to the circumferential edge face of the member 1. This is to assure that sliding contacts or analogous sensing members sliding on the circumferential edge face of the member 1, or more particularly on the rings 2, will readily slide onto and off the free edge face of the portion 7 of the member 3.

The member 3 further comprises projections 12 (see FIGS. 1 and 3) which in the illustrated embodiment are of one piece with the portion 7 but which could of course be discrete members rigidly connected with the remainder of the member 3. The projections 12 engage with the teeth 6 when the member 3 is positioned with its portion 11 located in the groove 4, whereby unintended displacement of the member 3 with reference to the groove 4 is prevented. The portion 11 of course also provides tilting and turning of the member 3 with reference to the groove 4.

The member 3 is also provided with a passage (compare FIGS. 1, 2 and 4) which is not separately identified with a reference numeral and in which there is turnably received a locking pin 8 (as seen in FIGS. 1, 2, 6 and 7). The locking pin 8 is suitably prevented from inadvertently sliding out of this bore or aperture and carries at its inner end which is located within the groove 4 at least one, but in the illustrated embodiment two diametrically opposite extensions 9 and at its opposite end, or rather at its opposite end face, a depression or recess 10 (see FIG. 7) of polygonal cross sectional outline. It will be appreciated that the member 8 can be turned by introducing a suitable tool into the recess 10 which is of course accessible exteriorly of the groove 4, and such turning can be basically between two positions in one of which the extensions 9 project in direction of elongation of the groove 4 intermediate the lateral undercuts thereof, so that the member 3 can be lifted and withdrawn from the groove or at least withdrawn to the extent that the projections 12 disengage the teeth 6 so that the member 3 can be moved to a desired circumferential location of the member 1, and in the other of which the extensions 9 extend transversely of the elongation of the groove 4 and project into the respective lateral undercuts so that the member 3 is reliably connected with the member 1.

The angle between two adjacent teeth 6, as seen with reference to the axis of rotation, is advantageously on the order of three degrees, but other values may of course also be acceptable.

It will be appreciated that the novel device according to the present invention can be used for purely mechanical programming and that particularly in this case but also in the case of electrical programming, the length, height and outline of the member 3 may be different from what has been illustrated.

It is advantageous if the free end portions of the members or elements 13 which project axially beyond the member 1 are so configurated that they can provide a mechanical and electrical connection with a similarly configurated and consrtucted device so that this second device will be carried by the first device in order to rotate with the same in unison. In this manner the second device can perform program control functions different from those performed by the first device, for instance in order to control different elements of the apparatus than those which are being controlled by the first device.

Provision of the cooperating teeth 6 and projections 12 makes it possible to locate the member 3 at precisely that circumferential position which is intended, or to perform the same locating function for two or more of these members. This precise positioning is of importance where two or more different operations are to be controlled in timed sequence, for instance loading of a container or vehicle and subsequent advancement of the loaded container.

By configurating the polygonal cross-sectional outline of the recess 10 in suitable manner it is possible to use a structural component of a toy with which the novel device is to be utilized, this structural component then constituting the tool by means of which the member 8 can be turned. It is well known that there are toy construction or erection kits wherein structural components are provided with undercut grooves and/or projecting coupling heads receivable in these undercut grooves. The present device can be used to advantage with such kits, and structural components provided with such coupling heads can be used to effect turning of the member 8, if the polygonal outline of the recess 10 is such that one of the coupling heads can be introduced into the recess 10 for the purpose of turning the member 8. This eliminates the need for provision and/or use of a special tool which may be lost or which in any case would increase the expenses involved in the manufacture and sale of the device.

Provision of the undercuts of the groove 4 in conjunction with the extensions 9 assures that the member 3 is tightly pressed against the circumferential surface of the member 1 and can be neither inadvertently separated therefrom nor loosened to the extent that it can slide circumferentially of this circumferential face. In fact, the member 3 is so well secured that any danger of its interference with the sensing means, that is sliding contact or analogous sensing instrumentalities, is precluded.

The advantage of having the member 3 cover portions of both of the rings 2 at the same time is to be seen in the fact that the circuit is interrupted at both rings which have opposite polarity, thus making the circumstances surrounding the interruption of an analogous circuit clearer to a child.

The arrangement of the connecting elements 13 and 14 in the manner illustrated makes it possible to electrically connect the elements 13 with one another if a single-phase control is desired so that the rings 2 are connected in series.

Furthermore, and although this is not illustrated it is also a concept according to the present invention, the portion 7 may extend beyond the rings 2 in axial direction of the member 1. This is of importance where two or more of the devices according to the present invention are to be connected for joint rotation, as outlined earlier, because it prevents electrical shorting between adjacent ones of the devices in the event of slight shifting of the sliding contacts, for instance resulting from vibrations or the like.

It will be understood that each of the elements described above, or two or more together, may also find a useful application in other types of devices differing from the types described above.

While the invention has been illustrated and described as embodied in a programming device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A programming device for programming the intermittent operation of an apparatus to be controlled by cooperation with a sensing instrumentality of such apparatus, comprising rotary means rotatable about an axis and having a circumferential edge face provided with an undercut circumferential groove; and programming means, including at least one programming member having a first portion received in said groove and a second portion projecting outwardly thereof beyond said edge face, said programming member being positionable at a plurality of circumferentially spaced locations of said rotary means so that, when a sensing instrumentality of an apparatus to be controlled slides on said edge face in response to rotation of said rotary means, such sensing instrumentality encounters and is deflected from said edge face by said programming member with a periodicity determined by the rate of revolution of said rotary means about said axis.

2. A device as defined in claim 1, said rotary means being a disc-shaped member.

3. A device as defined in claim 2, the apparatus to be controlled being an electric user with the sensing instrumentality thereof including a pair of sliding contacts, and said disc-shaped member consisting of electrically insulating material; further comprising a pair of electrically conductive rings affixed to said edge face at axially opposite sides of said groove with said sliding contacts each slidingly engaging one of said rings; and wherein said programming member consists of electrically insulating material and overlies said rings at its respective location so that electrical contact between said sliding contacts and said rings is interrupted when said sliding contacts encounter said programming member in response to rotation of said disc-shaped member.

4. A device as defined in claim 3, said second portion of said programming member having the shape of a segment of a circle.

5. A device as defined in claim 4; and further comprising cooperating stop portions provided in said groove and on said programming member and operative for preventing undesired displacement of the former longitudinally of the latter.

6. A device as defined in claim 5, said groove having a bottom wall, and said stop portions comprising a plurality of first projections provided on said bottom wall spaced circumferentially of said edge face, and second projection provided on said programming member and arranged to interengage with said first jrojections.

7. A device as defined in claim 3, said circumferential groove being undercut at opposite lateral sides thereof; and wherein said programming member comprises releasable locking means projecting from said second portion and arranged to extend into at least one undercut of said groove for thereby maintaining said programming member releasably connected with said disc-shaped member at a desired circumferential location of said edge face.

8. A device as defined in claim 7, said locking means comprising a pin member journalled for turning movement in said programming member and having a first end portion accessible exteriorly of said groove for effecting turning of said pin member, and a free second end portion provided with a pair of oppositely arranged transverse extensions each of which is arranged to extend into one undercut of said groove in response to turning of said pin member to a first position, and both of which are arranged to extend longitudinally of said groove intermediate said undercuts in response to turning of said pin member to a second position so that said programming member is released from connection with said disc-shaped member.

9. A device as defined in claim 8, said first end portion having an exposed end face provided with a recess of polygonal outline and into which a tool may be inserted to thereby effect turning of said pin member.

10. A device as defined in claim 4, said programming member having a radially directed free face and respective end portions facing in mutually opposite circumferential directions of said edge face, and said free face being in the region of the respective end portions tangentially inclined with reference to the circumferential edge face of said disc-shaped member.

11. A device as defined in claim 3; and further comprising elongated electrically conductive connecting members mounted in said disc-shaped member extending axially thereof and each electrically conductively connected with one of said rings.

12. A device as defined in claim 11, said connecting members comprising a first and a second connecting member mounted symmetrically with reference to said axis; and further comprising electrically conductive biasing means each bearing against and establishing electrical connection between one of said connecting members and one of said rings.

13. A device as defined in claim 12, said connecting members each having an exposed end portion projecting outwardly beyond an axial endface of said disc-shaped member.

14. A device as defined in claim 13, the exposed end portion of the respective connecting members being configurated as coupling portions arranged to mechanically and electrically connect said device with a similar device so that the latter similar device is supported by and rotatable with the former device.

References Cited

UNITED STATES PATENTS

| | | | |
|---|---|---|---|
| 3,164,689 | 1/1965 | Pensis | 200—8 XR |
| 3,226,496 | 12/1965 | Seabury | 200—11.24 |
| 3,260,804 | 7/1966 | Buzzi | 200—11.24 XR |

FOREIGN PATENTS

| | | |
|---|---|---|
| 309,290 | 4/1929 | Great Britain. |

ROBERT K. SCHAEFER, Primary Examiner

J. R. SCOTT, Assistant Examiner

U.S. Cl. X.R.

200—153